United States Patent
Berbecel et al.

(10) Patent No.: US 6,771,837 B1
(45) Date of Patent: Aug. 3, 2004

(54) METHOD AND APPARATUS FOR DIGITAL IMAGE RESCALING WITH ADAPTIVE CONTRAST ENHANCEMENT

(75) Inventors: Gheorghe Berbecel, Richmond Hill (CA); Steve Selby, Scarborough (CA)

(73) Assignee: Genesis Microchip Inc., Ontario (CA)

( * ) Notice: Subject to any disclaimer, the term of this patent is extended or adjusted under 35 U.S.C. 154(b) by 0 days.

(21) Appl. No.: 09/405,084

(22) Filed: Sep. 27, 1999

(51) Int. Cl.[7] .............................................. G06K 9/40
(52) U.S. Cl. ...................................................... 382/274
(58) Field of Search ................................ 382/260, 268, 382/269, 274, 279, 298, 299, 300; 348/61, 581, 597; 358/474, 488

(56) References Cited

U.S. PATENT DOCUMENTS 5,572,608 A  * 11/1996 Edgar .......................... 382/231
5,771,317 A  *  6/1998 Edgar .......................... 382/260

* cited by examiner

*Primary Examiner*—Jose L. Couso
(74) *Attorney, Agent, or Firm*—Staas & Halsey LLP (57) ABSTRACT

A method for generating from an input signal with a predetermined input spatial resolution a high contrast rescaled image having a predetermined output spatial resolution which differs from the input spatial resolution, comprising the steps of generating output samples from input samples of the input signal, detecting predetermined ones of the output samples which occur in excess of a predetermined time threshold from nearest occurring ones of said input samples detecting image details in the input signal at the nearest occurring ones of the input samples, and shifting the predetermined ones of the output samples so as to substantially align with the image details and thereby enhance image contrast of the details.

15 Claims, 5 Drawing Sheets

FIG. 1A
Input and output sampling grids

Before rescaling

After rescaling
FIG.1B
PRIOR ART

Before rescaling

After rescaling
FIG.1C
PRIOR ART

FIG. 1D
PRIOR ART

Before rescaling

After rescaling

FIG.2A
PRIOR ART

Non-uniform sampling, higher sampling rate

Non-uniform sampling, lower sampling rate

FIG. 3B
Non-uniform sampling
applied selectively

FIG. 4
Details detection algorithm

METHOD AND APPARATUS FOR DIGITAL IMAGE RESCALING WITH ADAPTIVE CONTRAST ENHANCEMENT

FIELD OF THE INVENTION

This invention relates in general to digital image rescaling, and more particularly to a method and apparatus for increasing the sharpness and uniformity of a rescaled image.

BACKGROUND OF THE INVENTION

Image rescaling or image resizing is a frequently required function in digital image processing systems. This function utilizes digital filtering of input picture elements (pixels) to generate output pixels. Because the eye is sensitive to changes in signal phase, the most commonly used filters in image rescaling are linear phase Finite Impulse Response (FIR) filters. The rescaling process is achieved by varying the input signal sampling rate. More specifically, the sampling rate is increased in order to enlarge an image, or decreased in order to shrink an image.

Variable rescaling factors may be obtained by first upsampling the signal at a fixed sampling rate, and then downsampling the upsampled signal at a different rate to achieve the required (variable) image rescaling factor. Usually, the first upsampling step utilizes an upsampling factor of 32 or 64. For efficient implementation, the upsampling and downsampling operations are normally combined, and only one sample is calculated for output, all other samples being ignored.

For a digital input signal x[n], the Fourier transform is $$X(e^{-j\omega}) = \Sigma_{k=0} x[k] e^{jk\omega}$$

and for a given finite impulse filter h[n], its Fourier transform is $$H(e^{-j\omega}) = \Sigma_{k=0}^{N-1} h[k] e^{-jk\omega}$$

In the upsampling stage, M−1 zeros are inserted between any subsequent two input samples, and the Fourier transform of the resultant upsampled signal is $X(e^{-jM\omega})$. The filter h[n] may be split into M filter phases, where the $k^{th}$ filter phase is $h_k[n]=h[k+Mn]$, and the Fourier transform is $$H_k(e^{-j\omega}) = \Sigma_{p=0} h[k+Mp] e^{jp\omega}$$

Splitting of the filter into phases, as discussed above, is possible only in the case of an integer upsampling factor.

The result of the convolution between the input signal and the filter h[n] is y[n] with the following Fourier transform $$Y(e^{-j\omega}) = X(e^{-jM\omega}) \Sigma_{p=0}^{M-1} H_k(e^{-jM\omega}) e^{-jp\omega}$$

$$Y(e^{-j\omega}) = \Sigma_{p=0}^{M-1} (XH_k)(e^{-jM\omega}) e^{-jp\omega}$$

Any output sample is a result of a convolution between the input signal, and a specific filter phase. For each upsampled input, there are M output samples which are the result of convolution of the input sample with all of the M filter phases. The M outputs are equally spaced over a time interval which corresponds to the period of the input sampling. When an output sample is required, its position is calculated, and the appropriate phase filter is selected for convolution with the input (the chosen phase being the closest to the physical location of the output sample).

Thus, in general, the foregoing rescaling process steps may be simplified as follows: (1) select the input data, (2) determine the phase of the filter, and (3) calculate the convolution between the data and the previously determined filter phase. Traditionally, the input data and the filter phase are calculated based on the position of the output sample. It is an object of an aspect of the invention to determine the optimum filter phase in order to obtain a rescaled image with high contrast.

According to one prior art method for increasing image contrast, peaking filters are used to boost the high frequencies. However, at low rescale factors, the boosting has little effect. Another method detects short transition times in the signal and artificially decreases those times by taking, for example, the first derivative of the signal. Unfortunately, this technique is not appropriate for graphics applications where the signal usually varies from minimum to maximum in a single step.

The following patents are relevant as prior art relative to the present invention:

| U.S. Patent Documents | | |
|---|---|---|
| 5,767,900 - Tanji; Ichiro | Jun. 16, 1998 | Digital Apparatus For Contour Enhancement Of Video Signals |
| 4,030,121 - Faroudja | Jun. 14, 1977 | Video Crispner |
| 3,997,772 - Ronald Eldon Crochiere, | Dec. 14, 1976 | Digital Phase Shifter |

SUMMARY OF THE INVENTION

According to the present invention, a method and apparatus are provided for improving the contrast of an image through the rescaling process. Traditionally, the rescaled output image is generated by sampling the input signal according to a uniform grid. When the ratio of the input and output sampling rates is not an integer, the processing is no longer spatially invariant. Thus, a given input detail becomes rescaled differently depending on the position of that detail in the input signal. Occasionally, an input detail is rescaled perfectly, but more often than not such details are poorly rescaled.

The method of the present invention detects those cases where uniform sampling fails to provide a good contrast, and through the use of non-uniform sampling, improves the local contrast.

BRIEF DESCRIPTION OF THE DRAWINGS

A description of the prior art and of the preferred embodiment of the present invention is provided herein below with references to the following drawings, in which.

DETAILED DESCRIPTION OF THE PREFERRED EMBODIMENT

Figure 1A:
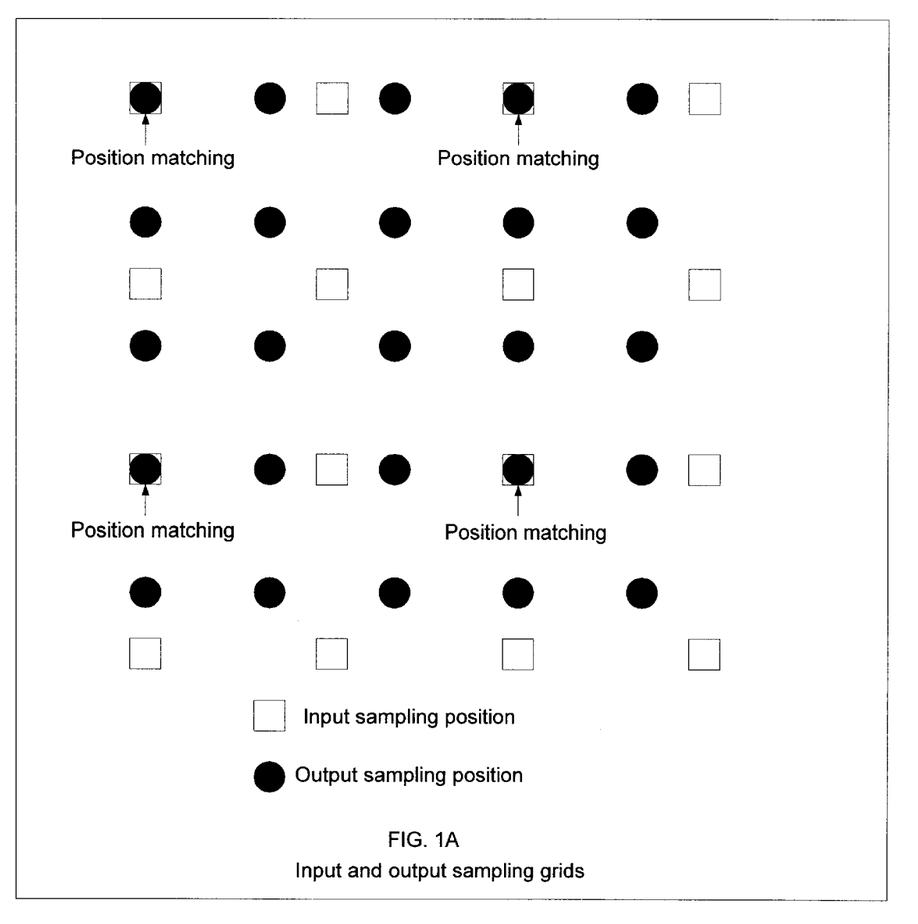
FIG. 1A is diagram showing the relative position of input and output uniform sampling grids, forming the environment to which the method and apparatus of the present invention is applied.

A digital image may be represented as an array of data, sampled or generated on a uniform rectangular grid. During the image resealing process, another array of data is calculated, providing output values on a uniform rectangular grid as well. FIG. 1A shows four corners of a rectangle in the input mapped to four corners of a rectangle in the output grid. It should be noted that the rectangles need not necessarily coincide with the physical corners of the image, but can be located anywhere inside or outside of the input/output image. The representation depicted in FIG. 1A is but one of many types of mapping that may be used. However, the simple representation of FIG. 1A serves to illustrate the environment in which the method and apparatus of the invention operate. Specifically, it will be noted that, for the general case of a non-integer rescale factor, as shown in FIG. 1A, some of the nodes of the output grid do not physically coincide with any node in the input grid.

The best local contrast is obtained when a detail appears only at a location available for display. Thus, in those situations where the output nodes do not coincide with any of the input nodes the contrast is degraded. The local contrast degradation becomes visible in the case of those details which have a size close to the picture element (e.g. for sharp edges, or a single line, or a single pixel).

As indicated briefly above, according to the present invention improved contrast of the rescaled image is obtained by applying a non-uniform sampling to align such details with the output grid as opposed to the input grid. The local contrast improves with better alignment of the details with the output grid. The inventive method detects those locations in the output grid where the non-alignment between the input and output grids is worse than a predetermined threshold. This detection is accomplished by means of pure geometrical calculation. In response, a subset of the nodes in the output is selected for contrast improvement. Next, the data adjacent the selected locations is checked, and if the data shows a detail (e.g. an edge or a line or a single pixel value) from a location selected for enhancement (i.e. identified by a rapid variation of the signal in that location), the sampling position is changed in that location to allow the detected detail to be better displayed on the output grid. The extent of the sampling position change (i.e. increase or decrease) is regulated by the conflicting requirements of obtaining maximum contrast enhancement while minimizing change in sampling position. Thus, there is a trade-off between the desired level of contrast enhancement and the tolerated degree of spatial non-uniformity introduced by changing the sampling position.

Figure 1B:
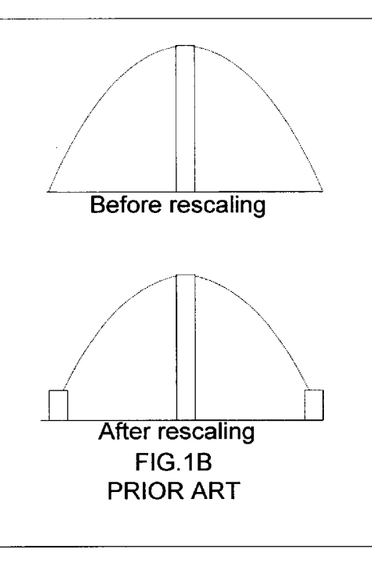
FIG. 1B is a schematic representation of an output pixel aligned with an input pixel.
Figure 1C:
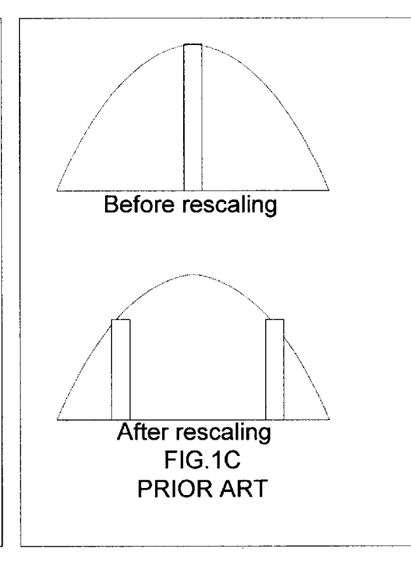
FIG. 1C is a schematic representation of an output pixel which is not aligned with an input pixel.

As shown in the impulse response diagram of FIG. 1B, when the output pixel is aligned with, or very close to an input pixel, no image distortion occurs. However, as shown in FIG. 1C, where output pixels are not closely aligned with the input pixels an image detail will be reproduced very differently in different positions. For example, in the first case (FIG. 1B) a single pixel wide line will be output also as a single pixel wide line, whereas in the second case (FIG. 1C) a single pixel wide line will be rescaled as a larger line (with a smaller brightness).

Figure 1D:
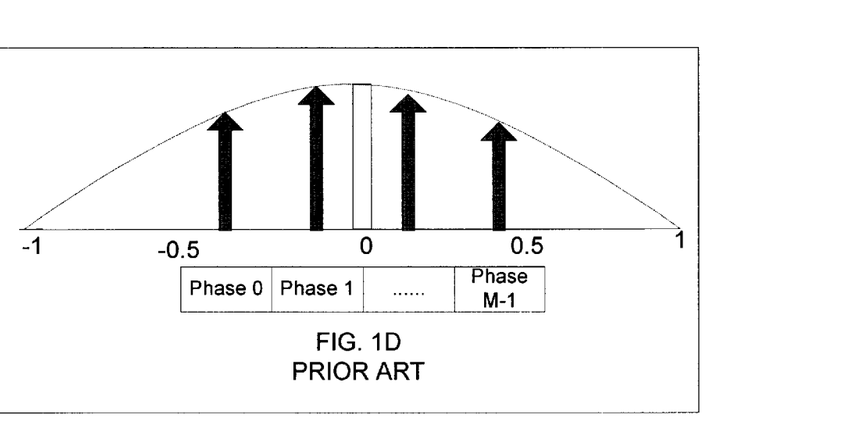
FIG. 1D is a schematic representation of polyphase interpolation.

FIG. 1D shows the image impulse response when polyphase interpolation is used, as is known in the prior art. The interpolation is shown in one dimension only, but can be applied in two dimensions as well. The space around an input pixel is split into a number of equally spaced intervals, referred to as signal phases. When an output sample is required, its position is calculated (i.e. the phase that the output pixel falls within) and the input signal is sampled according to that phase.

Figure 2A:
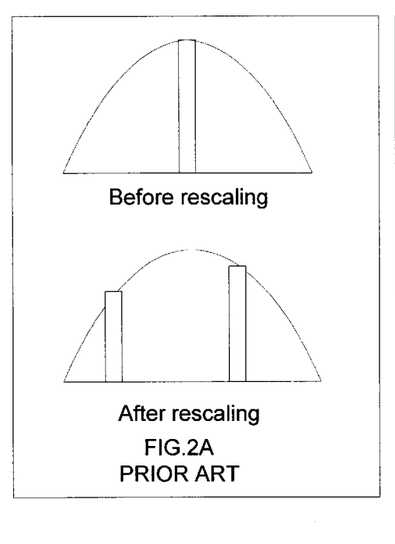
FIG. 2A is an illustration of how polyphase interpolation works with a uniform output grid, in accordance with the prior art.

The relationship between signal phase and filter phase is such that signal phase is calculated through a convolution of the data with the filter phase. The filter phase and the signal phase are numerically identified by the same number. In the example shown in FIG. 1D, the space between two subsequent pixels is split into M phases. In this context, the "local contrast" is defined as the absolute value of the energy difference between two adjacent pixels. As FIG. 2A shows, there are cases where, although the input is a pulse whose local contrast has a large value, the rescaled version of that input has a small local contrast.

Figure 2B:
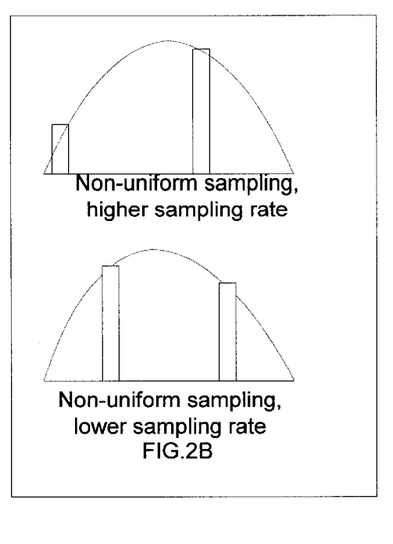
FIG. 2B shows how polyphase interpolation works with a non-uniform output grid.

According to the present invention, non-uniform sampling is performed, with one of two possible results shown in FIG. 2B. The top portion of FIG. 2B shows the situation where the phase calculation for the two output samples is changed by increasing the phase numbers by the same amount, whereas the lower diagram shows the results of decreasing the phase numbers by the same amount. Which one to choose, depends on the relative position of the input detail and the two output samples. The reason for changing only two sampling positions is that most of the energy of the input detail is concentrated into the two samples which are the closest to the detail whose contrast is to be improved. As FIG. 2B suggests, in one case the local contrast is improved whereas in the other case the local contrast is not improved (and is possibly worsened).

Figure 3A:
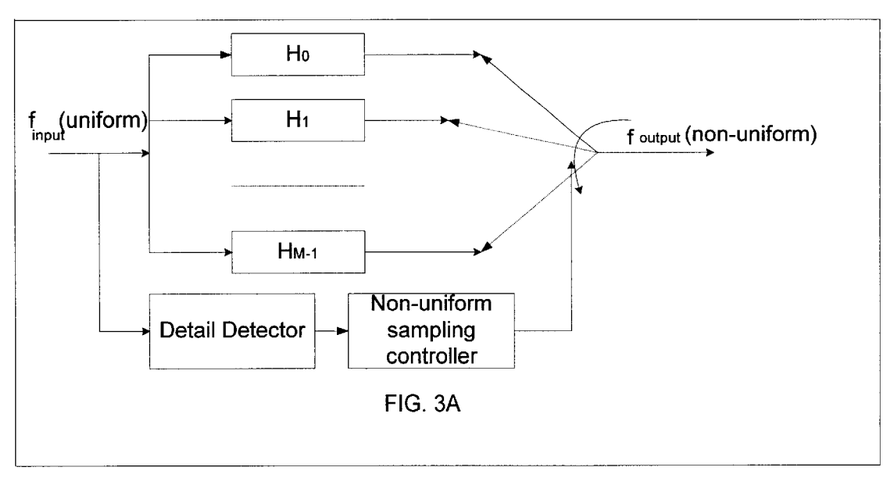
FIG. 3A is a block diagram of an apparatus according to the present invention for changing the output sampling rate when a detail is detected in such a position that would otherwise produce a low contrast detail.

FIG. 3A shows an apparatus according to the present invention comprising a filter which is split into phases ($H_0$, $H_1 \ldots H_{M-1}$), each phase of the filter is responsible for generating an output sample $f_{output}$ from an input sample $f_{input}$. A detail detector is provided for detecting special cases where uniform sampling fails to provide a good contrast, and through the use of a non-uniform sampling controller, improving the local contrast.

Figure 3B:
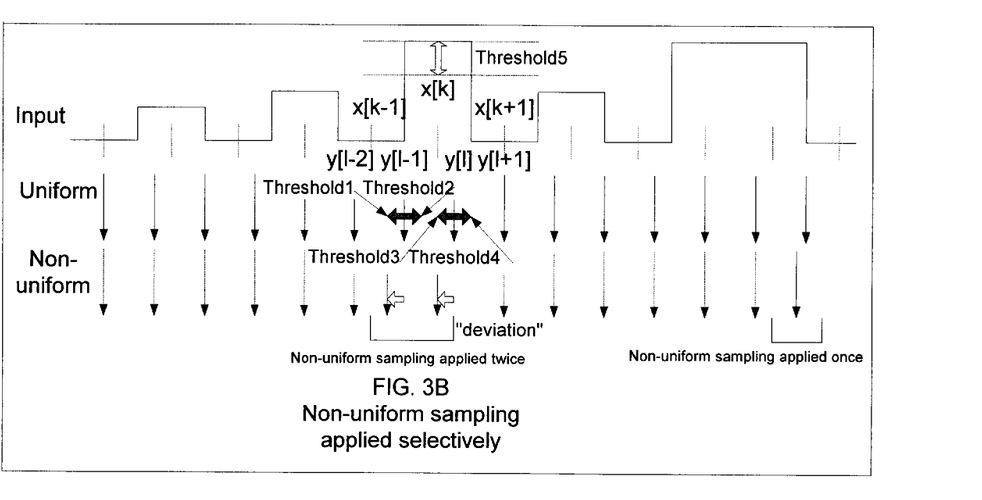
FIG. 3B is a timing diagram showing the difference between uniform and non-uniform sampling rates at the output.
Figure 4:
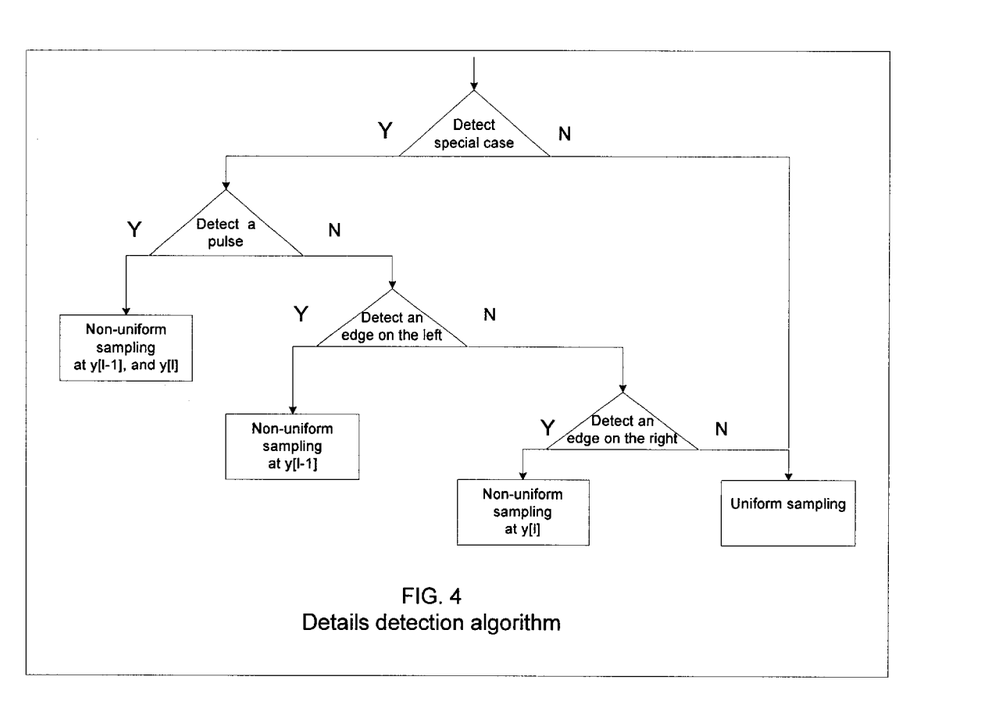
FIG. 4 is a flowchart showing a detail detection algorithm according to the preferred embodiment of the invention.

Details of the non-uniform sampling controller and detail detector are set forth below with reference to the timing diagram of FIG. 3B and the flowchart of FIG. 4. In the drawings and the following discussion, the step "detect a special case" means to detect situations where:

the output y[l−1] is the rightmost output sample between x[k−1] and x[k],

AND the output y[l] is the leftmost output sample between x[k] and x[k+1],

AND $$\text{Threshold1} < \text{phase}(y[l-1]) < \text{Threshold2},$$

AND $$\text{Threshold3} < \text{phase}(y[l]) < \text{Threshold4},$$

wherein the notation phase(.) denotes, for any output sample argument, its phase (an integer number between 0 an M−1, in accordance with FIG. 1C), and wherein Threshold1, Threshold2, Threshold3, Threshold4 are integer constants in the range of 0 to M−1, which define the location where uniform sampling does not provide sufficient local contrast. Threshold1 and Threshold2 specify the range of the first output sample, while Threshold3 and Threshold4 specify the range of the second output sample. The thresholds specify the amount of non-alignment which is considered acceptable.

The step referred to as "detect a pulse" is satisfied by:

$$(x[k+1]-x[k])*(x[k]-x[k-1])<0,$$

AND $$|x[k-1]-x[k]|>Threshold5,$$

AND $$|x[k]-x[k-1]|>Threshold5,$$

wherein Threshold5 is an integer value between 0 and the dynamic range value of the input signal, thereby limiting selection of only those input pulses which are sufficiently large. For those output samples which are not close to any input samples, and which have been previously detected as candidates for contrast enhancement, the data for the input pixel is tested to see whether or not the pixel contains a pulse, which means the current value x[k] is either greater or smaller than the previous x[k−1] and the next x[k+1].

The step "detect an edge on the left" is satisfied by:

$$|x[k]-x[k+1]|<Threshold6,$$

AND $$|x[k-1]-x[k]|>Threshold7,$$

wherein Threshold6 and Threshold7 are integers in the dynamic range of the input signal, for selection only of sufficiently large edges. Threshold6 is greater than 1, which provides for the filtering of noise, which otherwise would be amplified. Noise filtering is specifically useful in the case of separable processing, wherein the method is applied first in one direction, and the rescaling artifacts are processed further in the other direction. Even in the ideal case when the source is noise free, because of the two step rescaling processes (one direction at a time), the first rescaling stage will create some local details because of the nature of the filtering. These details can be interpreted as details in the signal and consequently amplified during rescaling in the other direction. Nonetheless, even in a single step rescaling process the noise threshold is useful because the signal has noise added during digital-to-analog and analog-to-digital conversions.

The step "detect a right edge" is satisfied by:

$$|x[k-1]-x[k]|<Threshold6,$$

$$|x[k]-x[k+1]|>Threshold7$$

When a non-uniform sampling requirement has been detected, phase(y[l−1]) and phase(y[l]) are compared with the phase corresponding with x[k], which is M/2 according to the notation of FIG. 1C, and a phase change is performed in such a way that the closest phase to the phase M/2, becomes even closer, which means:
if M/2−phase(y[l−1])<phase(y[l])−M/2, then the phase phase(y[l−1])+deviation is calculated for output instead of phase(y[l−1]). If the above condition is not satisfied, then the phase phase(y[l−1])-deviation is calculated instead of the phase(y[l−1]). The phase change must be limited to the range from 0 to M−1.

For example, with M=64 and a rescale factor of 1.25, then for phase(y[l−1])=6, and phase(y[l])=57, Threshold1=0, Threshold2=12, Threshold3=52 and Threshold.4=63, the condition becomes (32−6)<(57−32) which is false, which means phase y[l] is physically closer than y[l] to x[k]. In this case, a deviation is subtracted from phase(y[l−1]) and if there is a pulse, the deviation is subtracted from phase(y[l]) as well. The "deviation" can be set to 6 for this rescale factor, so that the new phases will be 6−6=0 for y[l−1] and 57−6=51 for y[l].

The value of "deviation" controls the level of aligmnent between the input and output pixels, and controls the image sharpness, and can have one value for edges and a different value for pulses. Under no circumstances can the value of "deviation" exceed M. In practical application, the value of "deviation" should be between M/8 and M/4, depending on the rescale factor.

In the case of a pulse, both phases y[l−1] and y[l] are changed by the same amount. In the case of an edge, only the phase which is on the edge is modified. The amount of phase change, or "deviation", is numerically different for pulses and edges. Specifically, an edge will have a value for "deviation" which is smaller than that for an edge. Thus, in the foregoing example, the "deviation" value for edges would be 4.

Other embodiments and variations are possible. For instance, although the preferred embodiment of the invention sets forth an image rescaling system with improved detail enhancement in a horizontal directions, the principle of the invention may be applied vertically or in both horizontal and vertical directions. This and other such alternative embodiments are believed to be within the sphere and scope of the invention as set forth in the claims appended hereto.

What is claimed is:

1. An apparatus for generating from an input signal with a predetermined input spatial resolution a high contrast rescaled image having a predetermined output spatial resolution which differs from said input spatial resolution, comprising:

a filter which is split into phases for generating output samples from input samples of said input signal;

a detail detector for detecting predetermined ones of said output samples which occur in excess of a predetermined spatial threshold from nearest occurring ones of said input samples and for detecting image details in said input signal at said nearest occurring ones of said input samples; and an output sampler for shifting said predetermined ones of said output samples so as to substantially align with said image details and thereby enhance image contrast of said details, said shifting effecting non-uniform output sampling.

2. An apparatus for generating from an input signal with a predetermined input spatial resolution a high contrast resealed image having a predetermined output spatial resolution which differs from said input spatial resolution, comprising:

a filter which is split into phases for generating output samples from input samples of said input signal;

a detail detector for detecting predetermined ones of said output samples which occur in excess of a predetermined spatial threshold from nearest occurring ones of said input samples and for detecting image details in said input signal at said nearest occurring ones of said input samples; and an output sampler for shifting said predetermined ones of said output samples so as to substantially align with said image details and thereby enhance image contrast of said details, and wherein said detail detector further comprises means for detecting a pulse image detail in excess of a predetermined amplitude and in response causing said output sampler to shift two adjacent ones of said output samples so as to substantially align with respective edges of said pulse image detail wherein said predetermined amplitude functions as a threshold for filtering noise from said image detail.

3. An apparatus for generating from an input signal with a predetermined input spatial resolution a high contrast rescaled image having a predetermined output spatial resolution which differs from said input spatial resolution, comprising:

a filter which is split into phases for generating output samples from input samples of said input signal;

a detail detector for detecting predetermined ones of said output samples which occur in excess of a predetermined spatial threshold from nearest occurring ones of said input samples and for detecting image details in said input signal at said nearest occurring ones of said input samples; and an output sampler for shifting said predetermined ones of said output samples so as to substantially align with said image details and thereby enhance image contrast of said details, and wherein said detail detector further includes means for detecting a left edge image detail in excess of a predetermined amplitude and in response causing said output sampler to shift an adjacent one of said output samples so as to substantially align with said left edge image detail wherein said further predetermined amplitude functions as a threshold for filtering noise from said image detail.

4. An apparatus for generating from an input signal with a predetermined input spatial resolution a high contrast rescaled image having a predetermined output spatial resolution which differs from said input spatial resolution, comprising:

a filter which is split into phases for generating output samples from input samples of said input signal;

a detail detector for detecting predetermined ones of said output samples which occur in excess of a predetermined spatial threshold from nearest occurring ones of said input samples and for detecting image details in said input signal at said nearest occurring ones of said input samples; and an output sampler for shifting said predetermined ones of said output samples so as to substantially align with said image details and thereby enhance image contrast of said details, and wherein said detail detector further includes means for detecting a right edge image detail in excess of a predetermined amplitude and in response causing said output sampler to shift an adjacent one of said output samples so as to substantially align with said right edge image detail wherein said predetermined amplitude functions as a threshold for filtering noise from said image detail.

5. A method for generating from an input signal with a predetermined input spatial resolution a high contrast resealed image having a predetermined output spatial resolution which differs from said input spatial resolution, comprising:

generating output samples from input samples of said input signal;

detecting predetermined ones of said output samples which occur in excess of a predetermined spatial threshold from nearest occurring ones of said input samples;

detecting image details in said input signal at said nearest occurring ones of said input samples; and shifting said predetermined ones of said output samples so as to substantially align with said image details and thereby enhance image contrast of said details, said shifting effecting non-uniform output sampling.

6. A method for generating from an input signal with a predetermined input spatial resolution a high contrast rescaled image having a predetermined output spatial resolution which differs from said input spatial resolution, comprising:

generating output samples from input samples of said input signal;

detecting predetermined ones of said output samples which occur in excess of a predetermined spatial threshold from nearest occurring ones of said input samples;

detecting image details in said input signal at said nearest occurring ones of said input samples; and shifting said predetermined ones of said output samples so as to substantially align with said image details and thereby enhance image contrast of said details, and wherein said detecting image details further comprises detecting a pulse image detail in excess of a predetermined amplitude and in response shifting an adjacent one of said output samples so as to substantially align with said left edge image detail, wherein said predetermined amplitude functions as a threshold for filtering noise from said image detail.

7. A method for generating from an input signal with a predetermined input spatial resolution a high contrast resealed image having a predetermined output spatial resolution which differs from said input spatial resolution, comprising the steps of:

generating output samples from input samples of said input signal;

detecting predetermined ones of said output samples which occur in excess of a predetermined spatial threshold from nearest occurring ones of said input samples;

detecting image details in said input signal at said nearest occurring ones of said input samples; and shifting said predetermined ones of said output samples so as to substantially align with said image details and thereby enhance image contrast of said details, and wherein said detecting image details further comprises detecting a left edge image detail in excess of a predetermined amplitude and in response shifting an adjacent one of said output samples so as to substantially align with said left edge image detail, wherein said further predetermined amplitude functions as a threshold for filtering noise from said image detail.

8. A method for generating from an input signal with a predetermined input spatial resolution a high contrast rescaled image having a predetermined output spatial resolution which differs from said input spatial resolution, comprising the steps of:

generating output samples from input samples of said input signal;

detecting predetermined ones of said output samples which occur in excess of a predetermined spatial threshold from nearest occurring ones of said input samples;

detecting image details in said input signal at said nearest occurring ones of said input samples; and shifting said predetermined ones of said output samples so as to substantially align with said image details and thereby enhance image contrast of said details, and wherein said detecting image details further comprises detecting a right edge image detail in excess of a predetermined amplitude and in response shifting an adjacent one of said output samples so as to substantially align with said right edge image detail wherein said predetermined amplitude functions as a threshold for filtering noise from said image detail.

9. The method of claim 2, wherein said shifting effects non-uniform output sampling.

10. The method of claim 3, wherein said shifting effects non-uniform output sampling.

11. The method of claim 4, wherein said shifting effects non-uniform output sampling.

12. The method of claim 6, wherein said shifting effects non-uniform output sampling.

13. The method of claim 7, wherein said shifting effects non-uniform output sampling.

14. The method of claim 8, wherein said shifting effects non-uniform output sampling.

15. An apparatus which generates a rescaled image of a specified spatial resolution which differs from a spatial resolution of an input signal, comprising:

a filter which generates output samples from input samples of the input signal, the filter being split into phases;

a detail detector which detects specified ones of the output samples a distance greater than a specified threshold from nearest occurring ones of the input samples and which detects image details in the input signal at the nearest occurring ones; and an output sampler which shifts the specified ones so as to substantially align with the image details and thereby enhance an image contrast of the details, the shifting effecting non-uniform output sampling.

* * * * *